(12) United States Patent
Ma

(10) Patent No.: US 11,792,700 B2
(45) Date of Patent: *Oct. 17, 2023

(54) METHOD AND DEVICE FOR CELL CHANGE

(71) Applicant: VIVO MOBILE COMMUNICATION CO., LTD., Guangdong (CN)

(72) Inventor: Yue Ma, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/718,119

(22) Filed: Apr. 11, 2022

(65) Prior Publication Data

US 2022/0240141 A1 Jul. 28, 2022

Related U.S. Application Data

(63) Continuation of application No. 17/037,401, filed on Sep. 29, 2020, now Pat. No. 11,330,485, which is a (Continued)

(30) Foreign Application Priority Data

Apr. 3, 2018 (CN) .......................... 201810294313.0

(51) Int. Cl.
*H04W 36/00* (2009.01)
*H04W 36/36* (2009.01)

(52) U.S. Cl.
CPC . *H04W 36/00837* (2018.08); *H04W 36/0088* (2013.01); *H04W 36/36* (2013.01)

(58) Field of Classification Search
CPC .................... H04W 36/00837; H04W 36/0088
See application file for complete search history.

(56) References Cited

U.S. PATENT DOCUMENTS

2013/0210422 A1* 8/2013 Pani ........................ H04W 8/02
455/423
2014/0045494 A1 2/2014 Pekonen et al.
(Continued)

FOREIGN PATENT DOCUMENTS

CN 101018386 A 8/2007
CN 101631366 A 1/2010
(Continued)

OTHER PUBLICATIONS

CN Office Action in Application No. 201810294313.0 dated Mar. 25, 2020.
(Continued)

*Primary Examiner* — Barry W Taylor
(74) *Attorney, Agent, or Firm* — Maschoff Brennan

(57) ABSTRACT

A method and a device for cell change. The method includes: receiving cell change configuration information sent by a source node, where the cell change configuration information includes at least one of: information for a terminal device to determine a target cell, cell change trigger condition information, a cell change command, and association relationship information related to the cell change; and performing an operation related to the cell change based on the cell change configuration information.

19 Claims, 2 Drawing Sheets

---

Receive cell change configuration information sent by a source node, where the cell change configuration information includes at least one of: information for a terminal device to determine a target cell, cell change trigger condition information, a cell change command, and association relationship information related to the cell change — S110

Perform an operation related to the cell change based on the cell change configuration information — S120

Related U.S. Application Data continuation of application No. PCT/CN2019/081232, filed on Apr. 3, 2019.

(56) References Cited

U.S. PATENT DOCUMENTS

| | | | |
|---|---|---|---|
| 2014/0092866 A1* | 4/2014 | Teyeb | H04W 36/24 370/331 |
| 2015/0133121 A1 | 5/2015 | Li et al. | |
| 2015/0189571 A1 | 7/2015 | Futaki | |
| 2015/0296426 A1* | 10/2015 | Mildh | H04W 36/0085 455/436 |
| 2015/0296428 A1 | 10/2015 | Michel et al. | |
| 2016/0021592 A1* | 1/2016 | Vesely | H04W 72/543 370/331 |
| 2016/0037425 A1* | 2/2016 | Van Lieshout | H04W 36/0088 370/332 |
| 2016/0192261 A1* | 6/2016 | Wang | H04W 36/30 370/331 |
| 2016/0295613 A1* | 10/2016 | Wager | H04W 72/23 |
| 2016/0345222 A1* | 11/2016 | Axmon | H04W 36/04 |
| 2019/0223073 A1* | 7/2019 | Chen | H04W 36/0058 |
| 2019/0380081 A1* | 12/2019 | Chang | H04W 36/18 |
| 2019/0387440 A1* | 12/2019 | Yiu | H04W 36/165 |
| 2020/0045602 A1 | 2/2020 | Jiang | |
| 2020/0068616 A1* | 2/2020 | Qian | H04W 74/002 |
| 2020/0396652 A1* | 12/2020 | Decarreau | H04W 36/36 |
| 2021/0176682 A1* | 6/2021 | Guo | H04W 36/34 |
| 2022/0060953 A1* | 2/2022 | Lee | H04W 36/30 |
| 2022/0201568 A1* | 6/2022 | Decarreau | H04W 36/00837 |

FOREIGN PATENT DOCUMENTS

| | | |
|---|---|---|
| CN | 102083159 A | 6/2011 |
| CN | 103781136 A | 5/2014 |
| CN | 104541538 A | 4/2015 |
| CN | 107113673 A | 8/2017 |
| CN | 107770824 A | 3/2018 |

OTHER PUBLICATIONS

U.S. Office Action in U.S. Appl. No. 17/037,401 dated Oct. 29, 2021.
European Search Report in Application No. 19781775.2 dated Apr. 26, 2021.
"Conditional Reconfiguration for NR" 3GPP TSG-RAN WG2 Meeting #99bis, InterDigital Communications, R2-1710669, Oct. 9, 2017.
"Introduction of Conditional handover" 3GPP TSG-RAN2#101, Samsung, R2-1802486, Feb. 26, 2018.
Written Opinion and International Search Report in Application No. PCT/CN2019/081232 dated Jun. 28, 2019.

* cited by examiner

METHOD AND DEVICE FOR CELL CHANGE

CROSS-REFERENCE TO RELATED APPLICATIONS

The present application claims the benefit of and is a continuation application of U.S. patent application Ser. No. 17/037,401, which is an application of PCT Application No. PCT/CN2019/081232 filed on Apr. 3, 2019, which claims a priority of the Chinese patent application No. 201810294313.0 filed on Apr. 3, 2018, which are incorporated herein by reference in their entirety.

TECHNICAL FIELD

This application relates to the field of communications technologies, and in particular, to a method and a device for cell change.

BACKGROUND

During communication between a terminal device and a network device in a wireless communications system, due to mobility, the connected terminal device may move from a coverage area of one base station to a coverage area of another base station. At this time, the terminal device needs to switch from an original wireless channel to a new wireless channel, that is, to complete handover (Handover).

In a long term evolution (Long Term Evolution, LTE) system, a main reason for handover failure is that a terminal device is unable to receive a handover command issued by a source base station in time. In a new radio (NR) system, as cells are deployed more densely, and a coverage area of a cell is relatively small, a terminal device performs handover more frequently. If the terminal device has not received a handover command issued by a source base station after moving into a coverage area of another base station, the handover fails. As such, in the NR system, a probability of handover failure increases if the system continues using the handover method of the LTE system.

In order to alleviate the above-mentioned problem, a conditional handover (Conditional Handover) method is introduced in the fifth-generation mobile communication technology (5th-Generation, 5G). In the conditional handover method, a terminal device receives cell change configuration information sent by a network device, and performs cell change when the terminal device determines that a trigger condition is met based on the cell change configuration information. However, content of the cell change configuration information sent by the network device to the terminal device is not defined at present, leading to low effectiveness of wireless communication.

SUMMARY

According to a first aspect, a method for cell change is provided, the method being performed by a terminal device and including:
    receiving cell change configuration information sent by a source node, where the cell change configuration information includes a cell change command; and
    performing an operation related to the cell change based on the cell change configuration information,
    wherein the cell change command comprises at least one of: identification information of the terminal device, radio configuration of the target cell, security information of the target cell, and a cell change capability of the terminal device,
    wherein there are one or more cell change commands, wherein each cell change command is a radio resource control RRC message or is embedded in an RRC message as a container; or there are a plurality of cell change commands, wherein the plurality of cell change commands are kept in one container.

According to a second aspect, a method for cell change is provided, the method being performed by a source node and including:
    sending cell change configuration information to a terminal device, where the cell change configuration information includes a cell change command,
    wherein the cell change command comprises at least one of: identification information of the terminal device, radio configuration of the target cell, security information of the target cell, and a cell change capability of the terminal device,
    wherein there are one or more cell change commands, wherein each cell change command is a radio resource control RRC message or is embedded in an RRC message as a container; or there are a plurality of cell change commands, wherein the plurality of cell change commands are kept in one container.

According to a third aspect, a terminal device is provided, including: a processor, a memory, and a computer program that is stored in the memory and capable of running on the processor, where when the computer program is executed by the processor, the steps of the method according to the first aspect are implemented.

According to a fourth aspect, a source node is provided, including: a processor, a memory, and a computer program that is stored in the memory and capable of running on the processor, where when the computer program is executed by the processor, the steps of the method according to the second aspect are implemented.

According to a fifth aspect, a non-transitory computer-readable storage medium is provided, storing a computer program, where when the computer program is executed by a processor, the steps of the method according to the first aspect are implemented.

According to a sixth aspect, a non-transitory computer-readable storage medium is provided, storing a computer program, where when the computer program is executed by a processor, the steps of the method according to the second aspect are implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the drawings.

DESCRIPTION OF EMBODIMENTS

Figure 1:
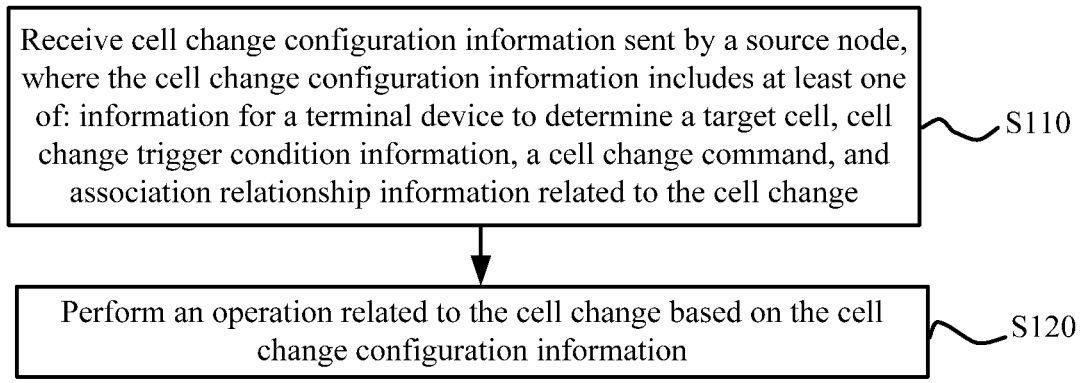
FIG. 1 is a schematic flowchart of a method for cell change according to an embodiment of this application.

The following clearly describes the technical solutions in embodiments of this disclosure with reference to the accompanying drawings in the embodiments of this disclosure. Apparently, the described embodiments are some rather than all of the embodiments of this disclosure. Based on the embodiments of this disclosure, all other embodiments derived by persons of ordinary skill in the art without creative efforts fall within the protection scope of this disclosure.

The technical solutions of this disclosure may be applied to various communications systems, such as a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE)/long term evolution-advanced (Long Term Evolution-advanced, LTE-A) system, and a new radio (NR) system.

User equipment (User Equipment, UE), also referred to as a mobile terminal (Mobile Terminal), a mobile user device, or the like, may communicate with one or more core networks through a radio access network (such as Radio Access Network, RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network.

A source node and a target node are apparatuses deployed in a radio access network to provide wireless communications functionality for a terminal device. The source node and the target node may be base stations. The base station may be a GSM or CDMA base station (Base Transceiver Station, BTS), or a WCDMA base station (NodeB), or an evolved NodeB (eNB or e-NodeB, evolved NodeB) or a 5G base station (gNB) in an LTE system.

It should be noted that when the method in the embodiments of this disclosure is applied in a single connection scenario, the source node and the target node are a source base station and a target base station, respectively. When the method in the embodiments of this disclosure is applied in a dual-connection scenario, the source node is a source master node (Master Node, MN) or a source secondary node (Secondary Node, SN), and the target node is a target secondary node. A target cell involved in the embodiments of this disclosure refers to a cell under the target node.

It should also be noted that cell change in the embodiments of this disclosure may be multiple changes of a single cell, or concurrent change of multiple cells (for example, a group of cells). The method of the embodiments of this disclosure may be applied to any cell change process, for example, a handover (Handover) process, a change process of a secondary cell, and a change process of an inter-system cell. The change process of a secondary cell may include SN Change, primary secondary cell (Primary Secondary Cell, PSCell) change, secondary cell (Secondary Cell, SCell) change, and the like.

The technical solutions provided in the embodiments of this disclosure are described in detail below with reference to the accompanying drawings.

FIG. 1 shows a method for cell change according to an embodiment of this application. As shown in FIG. 1, the method includes:

S110. Receive cell change configuration information sent by a source node, where the cell change configuration information includes at least one of: information for a terminal device to determine a target cell, cell change trigger condition information, a cell change command, and association relationship information related to the cell change.

It may be understood that the cell change configuration information may be sent by a target node to the source node, and then forwarded by the source node to the terminal device.

Optionally, in some embodiments, the information for the terminal device to determine a target cell includes identification information and frequency information of the target cell. The identification information may be, for example, an identifier (Identifier, ID) of the target cell, and the ID of the target cell may be, for example, a physical cell identifier (Physical Cell Identifier, PCI) of the target cell. When there is more than one target cell, the ID of the target cell may be a list of multiple cells or a cell index (Cell Index).

Optionally, in some embodiments, the cell change trigger condition information includes at least one of: measurement configuration, time to trigger (Time to Trigger, TTT) of measurement, and a cell change triggering mode.

In an example, the measurement configuration includes at least one of: a measurement triggering event (for example, a UE-specific (UE Specific) measurement triggering event or a cell-specific (Cell Specific) measurement triggering event), a measurement object (for example, a frequency or bandwidth part (Bandwidth Part, BWP)), a measurement quantity (for example, reference signal received power (Reference Signal Received Power (RSRP)), reference signal received quality (Reference Signal Received Quality (RSRQ)), or signal to interference plus noise ratio (Signal to Interference Plus Noise Ratio, SINR)), a type of a measurement reference signal (for example, a synchronization signal block (Synchronization Signal Block, SSB) or a channel state information-reference signal (Channel State Information-Reference Signal, RS)), a measurement start threshold, a measurement end threshold, and measurement duration. The measurement duration means that the measurement must be effectively triggered throughout the TTT time before conditional cell change may be triggered. The cell change triggering mode may be one of the following triggering modes: event-based triggering, periodic triggering, and non-periodic triggering.

Optionally, in some embodiments, the cell change command includes at least one of: identification information of the terminal device, radio configuration of the target cell, security information of the target cell, and a cell change capability of the terminal device. Herein, the identification information of the terminal device may be the ID of the terminal device. The radio configuration of the target cell may include related radio resource indication and configuration such as hierarchical configuration, data radio bearer (Data Radio Bearer, DRB) and/or signaling radio bearer (Signaling Radio Bearer, SRB) configuration. The security information of the target cell includes radio security information and non-access-stratum (Non-Access-Stratum, NAS) security information. The cell change capability of the terminal device includes one of the following capabilities: make before break (Make Before Break, MBB) cell change, random access channel less (Random Access Channel Less, RACH Less) cell change; and dual connectivity handover (Dual Connectivity Handover, DC Handover). Herein, the cell change capability of the terminal device may also be understood as a handover method adopted by the terminal device for cell handover.

In an example, there is one or more cell change commands, where each cell change command is a radio resource control (Radio Resource Control, RRC) message or is embedded in an RRC message as a container. Alternatively, there are a plurality of cell change commands, where the plurality of cell change commands are kept in one container. In other words, each cell change command may exist in the form of an RRC message, or it may exist in the form of a container. Alternatively, a group of cell change commands may be placed in a container.

Optionally, in some embodiments, the association relationship information related to the cell change includes association relationships between any of the following items: a target cell or a list of target cells (Cell List) or a group of target cells (Cell Group), a measurement object, measurement configuration, cell change trigger condition information, and a cell change command.

For example, the association relationship information related to the cell change includes: an association relationship between a target cell, cell change trigger condition information, and a cell change command. Alternatively, the association relationship information related to the cell change includes: an association relationship between a group of target cells, a group of cell change trigger condition information, and a cell change execution command. Alternatively, the association relationship information related to the cell change includes: association relationship between a target cell, measurement configuration, and a handover command for cell change. Alternatively, the association relationship information related to the cell change includes: association relationships between measurement configuration and a measurement object. The above-mentioned association relationship may be an association relationship established through the IDs of the items with an association relationship, an association relationship established through a bitmap, or an association relationship established through a whitelist in the measurement object. In addition, the association relationship herein may be a one-to-one association relationship, a one-to-many association relationship, a many-to-many association relationship, or a chain association relationship.

In an example, if the association relationship includes an association relationship between a target cell, a cell change command, measurement configuration, and a measurement object, and the association relationship is established through the IDs of the items with an association relationship, a signaling structure used to describe the association relationship may be shown by the following signaling structure 1 and signaling structure 2.Signaling format 1 is:

{CHO-ID, cho-CMD-ID, evaluationConfigId, measObjectID}

CHO-ID identifies a cell entity (a target cell) of the conditional change; cho-CMD-ID identifies a change command entity (a cell change command) corresponding to this ID; evaluationConfigId identifies evaluation measurement configuration (measurement configuration) corresponding to the CHO-ID; and measObjectID identifies a measurement object corresponding to the CHO-ID.

The evaluation measurement configuration (evaluationConfig) corresponding to the evaluationConfigId includes:

a measurement comparison or evaluation related parameter, such as {a measurement triggering event, a threshold corresponding to the measurement, a cell whitelist, a type of measurement RS, a measurement quantity, a parameter of a measurement filter (Filter), comparison time, a result validity period}.

Signaling format 2 is:
CHO-config
{cho-configID, evaluationConfigId, measObjectID}
CHO-execute
{cho-configID, cho-CMD, cell-ID}

CHO-config is associated with the measurement configuration (evaluationConfig) and the measurement object (measObject); and with respect to the execution entity, CHO-execute is associated with cho-configID and the target cell corresponding to the cho-CMD command.

S120. Perform an operation related to the cell change based on the cell change configuration information.

Specifically, in some embodiments, the performing, by the terminal device, an operation related to the cell change based on the cell change configuration information may include: determining, by the terminal device, whether a cell change trigger condition is met based on the cell change configuration information, and when the cell change trigger condition is met, selecting a target cell for the cell change; and initiating a random access process in the target cell; after the random access process is completed, sending, by the terminal device, a handover complete message to a target node, and disconnecting from the source node, so that the source node sends a conditional handover cancellation command to other target nodes and receives a conditional handover cancellation confirmation command sent by the other target nodes.

Further, to enable the source node to know whether and when the terminal device will perform cell change, the terminal device may send cell change indication information to the source node after receiving the cell change configuration information, where the cell change indication information is used by the source node to determine whether the terminal device performs cell change after sending the cell change indication information. This avoids resource waste caused as the source node reserves resources for the terminal device.

In this embodiment of this disclosure, optionally, the receiving cell change configuration information sent by a source node in S110 includes: receiving an RRC reconfiguration message sent by the source node, where the RRC reconfiguration message includes the cell change configuration information. Accordingly, before S120, the method shown in FIG. 1 further includes: storing the cell change configuration information in a form of a variable. As such, the method in this embodiment of this disclosure further determines content of the variable stored by the terminal device, further improving effectiveness of communication.

Specifically, in some embodiments, the storing the cell change configuration information in a form of a variable includes one of the following storage methods: storing the RRC reconfiguration message as a target variable; setting the RRC reconfiguration message as a target container, and storing the target container as a target variable; storing the cell change configuration information as a target variable; and setting the cell change configuration information as a target container, and storing the target container as a target variable.

For example, a signaling format for setting the RRC reconfiguration message as a target container and storing the target container as a target variable may be: UE_VarRRCRecofig Octet String (Container).

For another example, a signaling format for storing the cell change configuration information as a target variable may be a signaling format 3 below, where the variables in braces in the signaling format 3 correspond to information contained in the cell change configuration information, which are only examples and impose no limitation on the variables.

```
Signaling format 3:
UE_VarCHO sequence
{
measconfig       MeasConfig
   cellID                    CellIDList
   handoveCMD                Octet String
   ...
}.
```

For another example, a signaling format for setting the cell change configuration information as a target container and storing the target container as a target variable may be: UE_VarCHO Octet String.

Specifically, in some other embodiments, information contained in the cell change configuration information is stored as a separate variable; a part of the information contained in the cell change configuration information is stored as a separate variable, another part of the information contained in the cell change configuration information is set as a target container, and the target container is stored as a target variable, or another part of the information contained in the cell change configuration information is stored as a group variable; and at least a part of the information contained in the cell change configuration information is stored as a variable in a target protocol, where the target protocol is a communications protocol in a related technology.

For example, a signaling format for storing a part of the information contained in the cell change configuration information as a group variable may be a signaling format 4 below. For the VarMeasCHO sequence and VarchoCMD sequence group variables in the signaling format 4, the variables in the braces corresponding to the VarMeasCHO sequence correspond to the information contained in the cell change configuration information, and the variables in the braces corresponding to the VarchoCMD sequence correspond to the information contained in the cell change configuration information. Similarly, the variables herein are only examples and impose no limitation on the variables. The signaling format 4 is specifically as follows:

```
                VarMeasCHO sequence
                {CellID
                CellIDlist
                measID
                measIDtoAddModList
                measIDtoRemovelist
                measObject
                measObjecttoAddModList
                measObjecttoRemoveList
                TriggerConditionID
                TriggerConditionAddModList
                TriggerConditionRemoveList
                ...
                }
                VarchoCMD sequence
                {ReconfigureWithSycn
                MobilityRadioResource
                Security
                }
                ....
```

For another example, a signaling format for storing information contained in the cell change configuration information as a separate variable may be a signaling format 5 below. The variables here are just examples, and impose no limitation on the variable. The signaling format 5 is specifically as follows:

Var_measCHO
Var_ConfigCHO
Var_cell
Var_CMD Octet String
Var_trigger

It should be noted that the cell change configuration information in the foregoing embodiments of this disclosure may also be used in a negotiation process related to cell change between the source node and the target node, so that the method of the embodiments of this disclosure can determine content of configuration information negotiated between the network devices, which further improves effectiveness of communication.

Optionally, in some embodiments, when the cell change configuration information is used in a negotiation process related to cell change between the source node and the target node, the cell change configuration information further includes a measurement result of the terminal device, or the cell change configuration information further includes a predicted value of a measurement result of the terminal device by the source node or the target node. This can provide reasonable basis for negotiating a cell change trigger condition between the source node and the target node.

Figure 2:
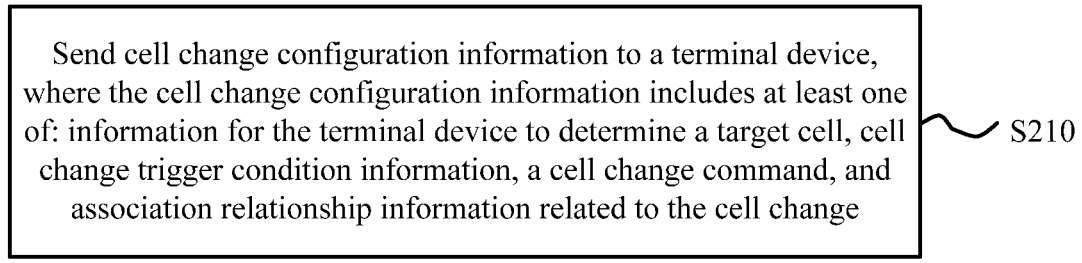
FIG. 2 is a schematic flowchart of a method for cell change according to another embodiment of this disclosure.

FIG. 2 shows a method for cell change according to another embodiment of this disclosure. It may be understood that interaction between a source node and a terminal device described from the source node side is the same as the description on the terminal device side in the method shown in FIG. 1, and therefore relevant description is appropriately omitted to avoid repetition. The method shown in FIG. 2 is executed by the source node and includes:

S210. Send cell change configuration information to a terminal device, where the cell change configuration information includes at least one of: information for the terminal device to determine a target cell, cell change trigger condition information, a cell change command, and association relationship information related to the cell change.

It may be understood that, before sending the cell change configuration information to the terminal device, the source node may receive the cell change configuration information sent by the target node. In this case, sending, by the source node, the cell change configuration information to the terminal device substantially means forwarding to the terminal device the cell change configuration information sent by the target node.

According to the method for cell change in this embodiment of this disclosure, the cell change configuration information sent by the source node to the terminal device includes at least one of: information for the terminal device to determine a target cell, cell change trigger condition information, a cell change command, and association relationship information related to the cell change. The terminal device can perform an operation related to the cell change based on the cell change configuration information, so that content of the cell change configuration information sent by a network device to the terminal device for conditional cell change can be determined, thereby improving effectiveness of wireless communication.

Optionally, in an embodiment, the information for the terminal device to determine a target cell includes identification information and frequency information of the target cell.

Optionally, in an embodiment, the cell change trigger condition information includes at least one of: measurement configuration, time to trigger TTT of measurement, and a cell change triggering mode.

Optionally, in an embodiment, the measurement configuration includes at least one of: a measurement triggering event, a measurement object, a measurement quantity, a type of a measurement reference signal, a measurement start threshold, a measurement end threshold, and measurement duration.

Optionally, in an embodiment, the cell change triggering mode is one of the following triggering modes: event-based triggering, periodic triggering, and non-periodic triggering.

Optionally, in an embodiment, the cell change command includes at least one of: identification information of the terminal device, radio configuration of the target cell, security information of the target cell, and a cell change capability of the terminal device.

Optionally, in an embodiment, there are one or more cell change commands, where each cell change command is a radio resource control RRC message or is embedded in an RRC message as a container; or there are a plurality of cell change commands, where the plurality of cell change commands are kept in one container.

Optionally, in an embodiment, the association relationship information related to the cell change includes association relationships between any of the following items: a target cell or a list of target cells or a group of target cells, a measurement object, measurement configuration, cell change trigger condition information, and a cell change command.

Optionally, in an embodiment, an association relationship contained in the association relationship information related to the cell change is established in one of the following manners:

identifications of the items with an association relationship;
a bitmap; and
a whitelist of measurement objects.

Optionally, in an embodiment, when the cell change configuration information is used in a negotiation process related to cell change between the source node and the target node, the cell change configuration information further includes a measurement result of the terminal device, or the cell change configuration information further includes a predicted value of a measurement result of the terminal device by the source node or the target node.

The method for cell change according to the embodiments of this disclosure is described above in detail with reference to FIG. 1 and FIG. 2. A terminal device according to the embodiments of this disclosure is described below in detail with reference to FIG. 3.

Figure 3:
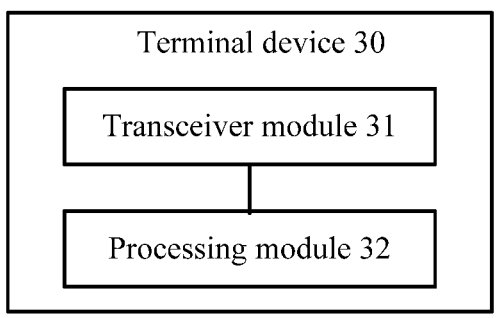
FIG. 3 is a schematic structural diagram of a terminal device according to an embodiment of this disclosure.

FIG. 3 is a schematic structural diagram of a terminal device according to an embodiment of this disclosure. As shown in FIG. 3, the terminal device 30 includes:

a transceiver module 31, configured to receive cell change configuration information sent by a source node, where the cell change configuration information includes at least one of: information for the terminal device to determine a target cell, cell change trigger condition information, a cell change command, and association relationship information related to the cell change; and a processing module 32, configured to perform an operation related to the cell change based on the cell change configuration information.

According to this embodiment of this disclosure, the cell change configuration information received by the terminal device from the source node includes at least one of: information for the terminal device to determine a target cell, cell change trigger condition information, a cell change command, and association relationship information related to the cell change. This can improve effectiveness of wireless communication.

Optionally, in an embodiment, the information for the terminal device to determine a target cell includes identification information and frequency information of the target cell.

Optionally, in an embodiment, the cell change trigger condition information includes at least one of: measurement configuration, time to trigger TTT of measurement, and a cell change triggering mode.

Optionally, in an embodiment, the measurement configuration includes at least one of: a measurement triggering event, a measurement object, a measurement quantity, a type of a measurement reference signal, a measurement start threshold, a measurement end threshold, and measurement duration.

Optionally, in an embodiment, the cell change triggering mode is one of the following triggering modes: event-based triggering, periodic triggering, and non-periodic triggering.

Optionally, in an embodiment, the cell change command includes at least one of: identification information of the terminal device, radio configuration of the target cell, security information of the target cell, and a cell change capability of the terminal device.

Optionally, in an embodiment, there are one or more cell change commands, where each cell change command is a radio resource control RRC message or is embedded in an RRC message as a container; or there are a plurality of cell change commands, where the plurality of cell change commands are kept in one container.

Optionally, in an embodiment, the association relationship information related to the cell change includes association relationships between any of the following items: a target cell or a list of target cells or a group of target cells, a measurement object, measurement configuration, cell change trigger condition information, and a cell change command.

Optionally, in an embodiment, an association relationship contained in the association relationship information related to the cell change is established in one of the following manners:

identifications of the items with an association relationship;
a bitmap; and
a whitelist of measurement objects.

Optionally, in an embodiment, when the cell change configuration information is used in a negotiation process related to cell change between the source node and the target node, the cell change configuration information further includes a measurement result of the terminal device, or the cell change configuration information further includes a predicted value of a measurement result of the terminal device by the source node or the target node.

Optionally, in an embodiment, the transceiver module 31 is specifically configured to:

receive a radio resource control RRC reconfiguration message sent by the source node, where the RRC reconfiguration message includes the cell change configuration information; and before the performing an operation related to cell change based on the cell change configuration information, the processing module 32 is further configured to:

store the cell change configuration information in a form of a variable.

Optionally, in an embodiment, the storing the cell change configuration information in a form of a variable includes one of the following storage manners:

storing the RRC reconfiguration message as a target variable;

setting the RRC reconfiguration message as a target container, and storing the target container as a target variable;

storing the cell change configuration information as a target variable; and setting the cell change configuration information as a target container, and storing the target container as a target variable.

Optionally, in an embodiment, the storing the cell change configuration information in a form of a variable includes one of the following storage manners:

storing information contained in the cell change configuration information as a separate variable;

storing a part of the information contained in the cell change configuration information as a separate variable, setting another part of the information contained in the cell change configuration information as a target container, and storing the target container as a target variable, or storing another part of the information contained in the cell change configuration information as a group variable; and storing at least a part of the information contained in the cell change configuration information as a variable in a target protocol, where the target protocol is a communications protocol in a related technology.

The terminal device provided by this embodiment of this disclosure may implement each process implemented by the terminal device in the method embodiment in FIG. 1, and details are not described here again to avoid repetition.

Figure 4:
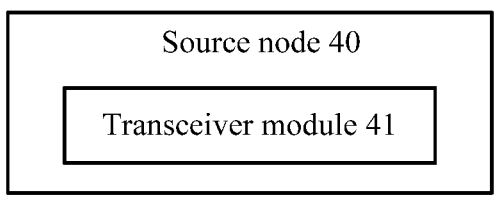
FIG. 4 is a schematic structural diagram of a source node according to an embodiment of this disclosure.

FIG. 4 is a schematic structural diagram of a source node according to an embodiment of this disclosure. As shown in FIG. 4, the source node 40 includes:

a transceiver module 41, configured to send cell change configuration information to a terminal device, where the cell change configuration information includes at least one of: information for the terminal device to determine a target cell, cell change trigger condition information, a cell change command, and association relationship information related to the cell change.

According to this embodiment of this disclosure, the cell change configuration information sent by the source node to the terminal device includes at least one of: information for the terminal device to determine a target cell, cell change trigger condition information, a cell change command, and association relationship information related to the cell change. This can improve effectiveness of wireless communication.

Optionally, in an embodiment, the information for the terminal device to determine a target cell includes identification information and frequency information of the target cell.

Optionally, in an embodiment, the cell change trigger condition information includes at least one of: measurement configuration, time to trigger TTT of measurement, and a cell change triggering mode.

Optionally, in an embodiment, the measurement configuration includes at least one of: a measurement triggering event, a measurement object, a measurement quantity, a type of a measurement reference signal, a measurement start threshold, a measurement end threshold, and measurement duration.

Optionally, in an embodiment, the cell change triggering mode is one of the following triggering modes: event-based triggering, periodic triggering, and non-periodic triggering.

Optionally, in an embodiment, the cell change command includes at least one of: identification information of the terminal device, radio configuration of the target cell, security information of the target cell, and a cell change capability of the terminal device.

Optionally, in an embodiment, there are one or more cell change commands, where each cell change command is a radio resource control RRC message or is embedded in an RRC message as a container; or there are a plurality of cell change commands, where the plurality of cell change commands are kept in one container.

Optionally, in an embodiment, the association relationship information related to the cell change includes association relationships between any of the following items: a target cell or a list of target cells or a group of target cells, a measurement object, measurement configuration, cell change trigger condition information, and a cell change command.

Optionally, in an embodiment, an association relationship contained in the association relationship information related to the cell change is established in one of the following manners:

identifications of the items with an association relationship;

a bitmap; and a whitelist of measurement objects.

Optionally, in an embodiment, when the cell change configuration information is used in a negotiation process related to cell change between the source node and the target node, the cell change configuration information further includes a measurement result of the terminal device, or the cell change configuration information further includes a predicted value of a measurement result of the terminal device by the source node or the target node.

The source node provided by this embodiment of this disclosure can implement each process implemented by the source node in the method embodiment in FIG. 2, and details are not described here again to avoid repetition.

Figure 5:
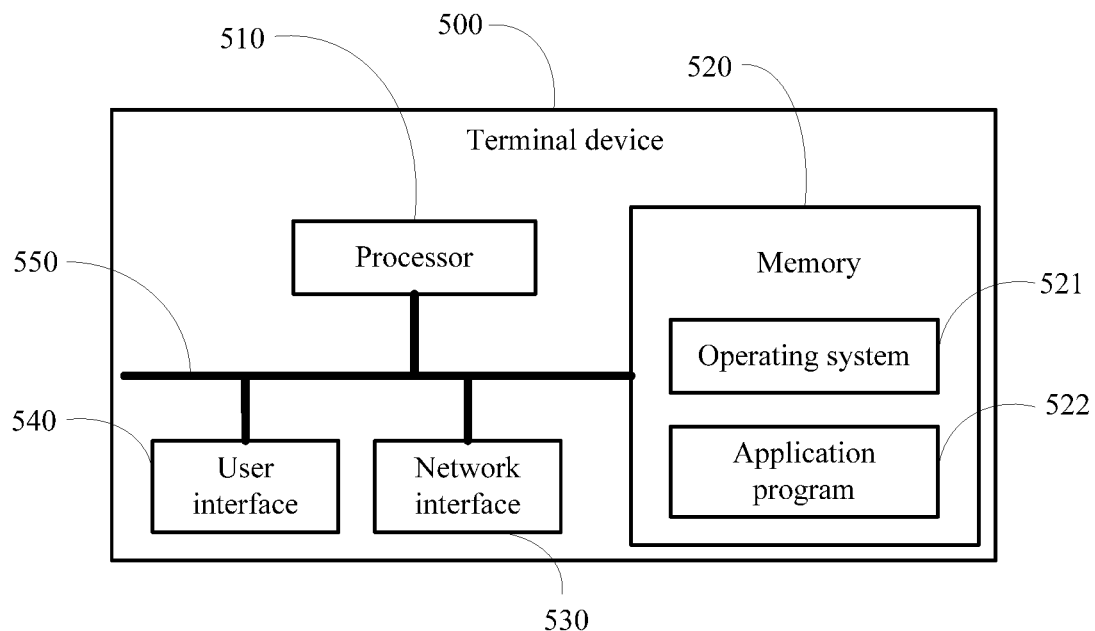
FIG. 5 is a schematic structural diagram of a terminal device according to another embodiment of this disclosure.

FIG. 5 shows a schematic structural diagram of a terminal device according to another embodiment of this disclosure. As shown in FIG. 5, the terminal device 500 includes: at least one processor 510, a memory 520, at least one network interface 530, and a user interface 540. The components in the terminal device 500 are coupled together through a bus system 550. It may be understood that the bus system 550 is configured to implement connection communication between these components. In addition to a data bus, the bus system 550 further includes a power bus, a control bus, and a status signal bus. However, for clarity of description, various buses are marked as the bus system 550 in FIG. 5.

The user interface 540 may include a display, a keyboard, or a pointing device (for example, a mouse, a trackball (trackball), a touch panel, or a touchscreen).

It may be understood that the memory 520 in the embodiments of this disclosure may be a volatile memory or a nonvolatile memory, or may include both a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synclink DRAM, SLDRAM), and a direct Rambus dynamic random access memory (Direct Rambus RAM, DRRAM). It should be noted that the memory 320 of the system and the method described in the embodiments of this disclosure is intended to include but is not limited to these and any other proper types of memories.

In some implementations, the memory 520 stores the following elements: an executable module or a data structure, or a subset thereof, or an extended set thereof: an operating system 521 and an application program 522.

The operating system 521 includes various system programs used to implement various basic services and process a hardware-based task, such as a framework layer, a kernel library layer, and a driving layer. The application program 522 includes various application programs used to implement various application services, such as a media player (Media Player) and a browser (Browser). A program for implementing the method according to the embodiments of this disclosure may be included in the application program 522.

In this embodiment of this disclosure, the terminal device 500 further includes: a computer program that is stored in the memory 520 and capable of running on the processor 510. When the computer program is executed by the processor 510, various processes of the method described above with reference to FIG. 1 are implemented, and the same technical effect can be achieved. Details are not described here again to avoid repetition.

The methods disclosed in the foregoing embodiments of this disclosure may be applied to the processor 510, or may be implemented by the processor 510. The processor 510 may be an integrated circuit chip and has a signal processing capability. In an implementation process, steps in the foregoing method may be implemented by using a hardware integrated logical circuit in the processor 510, or by using instructions in a form of software. The foregoing processor 510 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The methods, steps, and logical block diagrams that are disclosed in the embodiments of this disclosure may be implemented or performed. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 520, and the processor 510 fetches information in the memory 520 and completes the steps of the foregoing methods in combination with hardware of the processor. Specifically, the computer-readable storage medium stores a computer program, and when the computer program is executed by the processor 510, the steps in the method embodiment described above with reference to FIG. 1 are implemented.

It can be understood that the embodiments described in the embodiments of this disclosure may be implemented by hardware, software, firmware, middleware, microcode, or a combination thereof. For hardware implementation, a processing unit may be implemented in one or more application-specific integrated circuits (Application Specific Integrated Circuit, ASIC) (Application Specific Integrated Circuits, ASIC), digital signal processors (Digital Signal Processor, DSP), digital signal processing devices (DSP Device, DSPD), programmable logic devices (Programmable Logic Device, PLD), field programmable gate arrays (Field-Programmable Gate Array, FPGA), general-purpose processors, controllers, microcontrollers, microprocessors, and other electronic units for performing the functions described in this disclosure, or a combination thereof.

For software implementation, the technology described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

Figure 6:
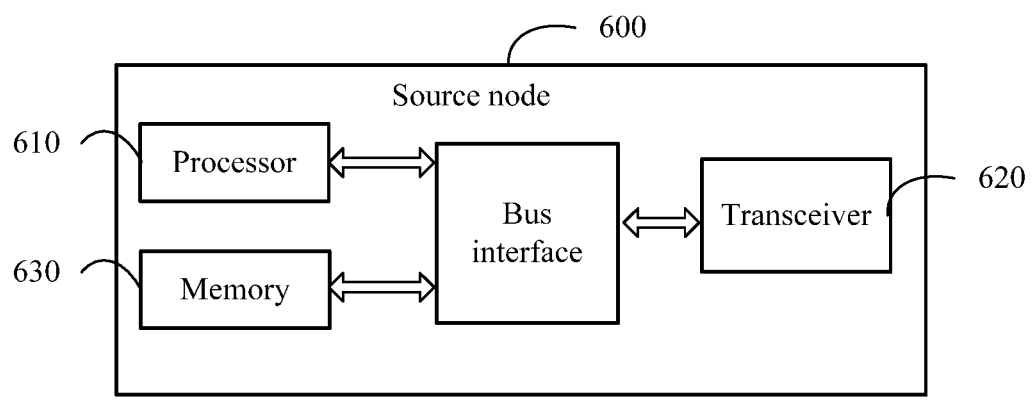
FIG. 6 is a schematic structural diagram of a source node according to another embodiment of this disclosure.

FIG. 6 is a schematic structural diagram of a source node according to another embodiment of this disclosure. As shown in FIG. 6, the source node 600 includes a processor 610, a transceiver 620, a memory 630, and a bus interface.

In this embodiment of this disclosure, the source node 600 further includes: a computer program that is stored in the memory 630 and capable of running on the processor 610. When the computer program is executed by the processor 610, various processes of the method described above with reference to FIG. 2 are implemented, and the same technical effect can be achieved. Therefore, details are not described here again to avoid repetition.

In FIG. 6, a bus architecture may include any quantity of interconnected buses and bridges, and specifically connect together various circuits of one or more processors represented by the processor 610 and a memory represented by the memory 630. The bus architecture may further connect, for example, a peripheral device or a voltage stabilizer to various other circuits such as a power management circuit. These are well known in the art, and therefore are not further described in this specification. A bus interface provides an interface. The transceiver 620 may be a plurality of elements, including a transmitter and a receiver, and provides units configured to perform communication with various other apparatuses over a transmission medium.

The processor 610 is responsible for management of the bus architecture and general processing, and the memory 630 may store data used by the processor 610 when the processor 610 performs an operation.

An embodiment of this disclosure provides a computer-readable storage medium, the computer-readable storage medium storing a computer program, where when the computer program is executed by a processor, various processes of the methods described above with reference to FIG. 1 and FIG. 2 are implemented, and the same technical effect can be achieved. Therefore, details are not described here again to avoid repetition. The computer-readable storage medium is, for example, a read-only memory (Read-Only Memory, ROM for short), a random access memory (Random Access Memory, RAM for short), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Through the description of the foregoing embodiments, a person skilled in the art can clearly appreciate that the method of the foregoing embodiments may be implemented by software on a necessary general-purpose hardware platform, and certainly may be implemented by hardware. However, in many cases, the former is a more preferred implementation. Based on such an understanding, the technical solutions of this disclosure essentially or the part contributing to the related art may be embodied in the form of a software product. The computer software product is stored in a storage medium (such as a ROM/RAM, magnetic disk, or optical disc) and includes several instructions for instructing a terminal (which may be a mobile phone, a computer, a server, an air conditioner, or a network device) to perform the methods described in the embodiments of this disclosure.

The embodiments of this disclosure are described above with reference to the accompanying drawings, but this disclosure is not limited to the foregoing implementations. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

The invention claimed is:

1. A method for cell change, the method being performed by a terminal device and comprising:
receiving cell change configuration information sent by a source node, wherein the cell change configuration information comprises a cell change command; and
performing an operation related to the cell change based on the cell change configuration information,
wherein the cell change command comprises at least one of: identification information of the terminal device, radio configuration of the target cell, security information of the target cell, or a cell change capability of the terminal device,
wherein there are a plurality of cell change commands, wherein the plurality of cell change commands are kept in one container, and
wherein the receiving cell change configuration information sent by a source node comprises:
receiving a radio resource control RRC reconfiguration message sent by the source node, wherein the RRC reconfiguration message comprises the cell change configuration information; and
before the performing an operation related to cell change based on the cell change configuration information, the method further comprises:
storing the cell change configuration information in a form of a variable.

2. The method according to claim 1, wherein the cell change configuration information further comprises information for the terminal device to determine a target cell, and the information for the terminal device to determine a target cell comprises identification information and frequency information of the target cell; and
wherein the plurality of cell change commands are embedded in a Radio Resource Control (RRC) message as the one container.

3. The method according to claim 1, wherein the cell change configuration information further comprises cell change trigger condition information, and the cell change trigger condition information comprises at least one of: measurement configuration, time to trigger TTT of measurement, or a cell change triggering mode.

4. The method according to claim 3, wherein the measurement configuration comprises at least one of: measurement trigger event, a measurement object, a measurement quantity, a type of a measurement reference signal, a measurement start threshold, a measurement end threshold, or measurement duration.

5. The method according to claim 3, wherein the cell change triggering mode is one of the following triggering modes: event-based triggering, periodic triggering, or non-periodic triggering.

6. The method according to claim 1, wherein the cell change configuration information further comprises association relationship information related to cell change, and the association relationship information related to cell change comprises association relationships between any of the following items: a target cell or a list of target cells or a group of target cells, a measurement object, measurement configuration, cell change trigger condition information, or a cell change command,
wherein an association relationship contained in the association relationship information related to cell change is established in one of the following manners:
identifications of the items with an association relationship;
a bitmap; or
a whitelist of measurement objects.

7. The method according to claim 1, wherein when the cell change configuration information is used in a negotiation process related to cell change between the source node and a target node, the cell change configuration information further comprises a measurement result of the terminal device, or the cell change configuration information further comprises a predicted value of a measurement result of the terminal device by the source node or the target node.

8. The method according to claim 1, wherein the storing the cell change configuration information in a form of a variable comprises one of the following storage manners:
  storing the RRC reconfiguration message as a target variable;
  setting the RRC reconfiguration message as a target container, and storing the target container as a target variable;
  storing the cell change configuration information as a target variable; or
  setting the cell change configuration information as a target container, and storing the target container as a target variable.

9. The method according to claim 1, wherein the storing the cell change configuration information in a form of a variable comprises one of the following storage manners:
  storing information contained in the cell change configuration information as a separate variable;
  storing a part of the information contained in the cell change configuration information as a separate variable, setting another part of the information contained in the cell change configuration information as a target container, and storing the target container as a target variable, or storing another part of the information contained in the cell change configuration information as a group variable; or
  storing at least a part of the information contained in the cell change configuration information as a variable in a target protocol, wherein the target protocol is a communications protocol in a related technology.

10. A non-transitory computer-readable storage medium storing therein a computer instruction, wherein the computer instruction is executed by a computer so as to implement the steps of the method for cell change according to claim 1.

11. A method for cell change, the method being performed by a source node and comprising:
  sending cell change configuration information to a terminal device, wherein the cell change configuration information comprises a cell change command,
  wherein the cell change command comprises at least one of: identification information of the terminal device, radio configuration of the target cell, security information of the target cell, or a cell change capability of the terminal device,
  wherein there are a plurality of cell change commands, wherein the plurality of cell change commands are kept in one container, and
  wherein the sending cell change configuration information to a terminal device comprises:
  sending a radio resource control RRC reconfiguration message to the terminal device, wherein the RRC reconfiguration message comprises the cell change configuration information; and
  wherein the cell change configuration information is stored at the terminal device in a form of a variable.

12. The method according to claim 11, wherein the cell change configuration information further comprises information for the terminal device to determine a target cell, and
  the information for the terminal device to determine a target cell comprises identification information and frequency information of the target cell; and
  wherein the plurality of cell change commands are embedded in a Radio Resource Control (RRC) message as the one container.

13. The method according to claim 11, wherein the cell change configuration information further comprises cell change trigger condition information, and the cell change trigger condition information comprises at least one of: measurement configuration, time to trigger TTT of measurement, or a cell change triggering mode.

14. The method according to claim 13, wherein the measurement configuration comprises at least one of: a measurement triggering event, a measurement object, a measurement quantity, a type of a measurement reference signal, a measurement start threshold, a measurement end threshold, or measurement duration,
  wherein the cell change triggering mode is one of the following triggering modes: event-based triggering, periodic triggering, or non-periodic triggering.

15. The method according to claim 11, wherein the cell change configuration information further comprises association relationship information related to the cell change, and the association relationship information related to the cell change comprises association relationships between any of the following items: a target cell or a list of target cells or a group of target cells, a measurement object, measurement configuration, cell change trigger condition information, or a cell change command,
  wherein association relationship contained in the association relationship information related to the cell change is established in one of the following manners:
  identifications of the items with an association relationship;
  a bitmap; or a bitmap; and
  a whitelist of measurement objects.

16. The method according to claim 11, wherein when the cell change configuration information is used in a negotiation process related to cell change between the source node and a target node, the cell change configuration information further comprises a measurement result of the terminal device, or the cell change configuration information further comprises a predicted value of a measurement result of the terminal device by the source node or the target node.

17. A source node, comprising: a memory, a processor, and a computer program that is stored in the memory and capable of running on the processor, wherein when the computer program is executed by the processor, the steps of the method for cell change according to claim 11 are implemented.

18. A non-transitory computer-readable storage medium storing therein a computer instruction, wherein the computer instruction is executed by a computer so as to implement the steps of the method for cell change according to claim 11.

19. A terminal device, comprising: a memory, a processor, and a computer program that is stored in the memory and capable of running on the processor, wherein when the computer program is executed by the processor, the steps of a method for cell change are implemented,
  the method comprising:
  receiving cell change configuration information sent by a source node, wherein the cell change configuration information comprises a cell change command; and
  performing an operation related to the cell change based on the cell change configuration information,
  wherein the cell change command comprises at least one of: identification information of the terminal device, radio configuration of the target cell, security information of the target cell, and a cell change capability of the terminal device,
  wherein there are a plurality of cell change commands, wherein the plurality of cell change commands are kept in one container, and wherein the receiving cell change configuration information sent by a source node comprises:
receiving a radio resource control RRC reconfiguration message sent by the source node, wherein the RRC reconfiguration message comprises the cell change configuration information; and
before the performing an operation related to cell change based on the cell change configuration information, the method further comprises:
storing the cell change configuration information in a form of a variable.

* * * * *